(12) United States Patent  (10) Patent No.: US 7,883,225 B2
Courbon et al.  (45) Date of Patent: Feb. 8, 2011

(54) MIRROR STABILIZER ARM CONNECTOR ASSEMBLY

(75) Inventors: Emmanuel Courbon, Columbia, SC (US); Andreas Enz, Columbia, SC (US)

(73) Assignee: Lang-Mekra North America, LLC, Ridgeway, SC (US)

( * ) Notice: Subject to any disclaimer, the term of this patent is extended or adjusted under 35 U.S.C. 154(b) by 569 days.

(21) Appl. No.: 11/977,381

(22) Filed: Oct. 24, 2007

(65) Prior Publication Data

US 2008/0088958 A1  Apr. 17, 2008

Related U.S. Application Data

(63) Continuation-in-part of application No. 11/122,462, filed on May 4, 2005, now Pat. No. 7,303,293.

(51) Int. Cl.
G02B 5/08 (2006.01)
G02B 7/18 (2006.01)

(52) U.S. Cl. .......... 359/841; 359/881; 248/478
(58) Field of Classification Search ........ 359/841, 359/871, 872, 875, 881; 248/476–480
See application file for complete search history.

(56) References Cited

U.S. PATENT DOCUMENTS

| | | |
|---|---|---|
| 2,458,117 A | 1/1949 | Tolbert |
| 2,545,777 A | 3/1951 | Hardin |
| 2,552,074 A | 5/1951 | Thompson |
| 3,168,277 A | 2/1965 | Stewart |
| 3,259,349 A | 7/1966 | Lee |
| 3,371,903 A | 3/1968 | Thompson |
| 3,501,122 A | 3/1970 | Barker |
| 3,637,186 A | 1/1972 | Greenfield |
| 3,831,896 A | 8/1974 | Owens |
| 3,857,539 A | 12/1974 | Kavanaugh |
| 5,880,895 A | 3/1999 | Lang et al. |
| D462,305 S | 9/2002 | Abalos et al. |
| 6,578,973 B2 | 6/2003 | Apfelbeck |
| 6,598,983 B1 | 7/2003 | Boddy |
| 6,962,420 B2 | 11/2005 | Branham |
| 2003/0116690 A1 | 6/2003 | Frazier et al. |

*Primary Examiner*—Alessandro Amari
(74) *Attorney, Agent, or Firm*—McNair Law Firm, P.A.; Seann P. Lahey

(57) ABSTRACT

A connector assembly for releasably attaching a stabilizer arm to a support arm of a vehicle exterior rearview mirror. The assembly includes a connector head carried by the stabilizer arm and a connector receiver is carried by the other of said stabilizer arm and support arm. A retention slot is included in said connector receiver for receiving said connector head. A biasing element is carried in said retention slot for biasing against said connector head when received in said retention slot. A catch tongue projects from one of said connector head and said biasing element. A catch recess is carried by the other of said connector head and said biasing element which is complementary to said catch tongue for interlocking said connector head with said biasing element in said retention slot to provide an increased surface area of engagement.

24 Claims, 10 Drawing Sheets

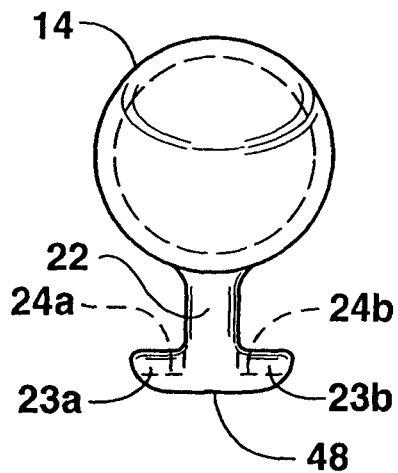
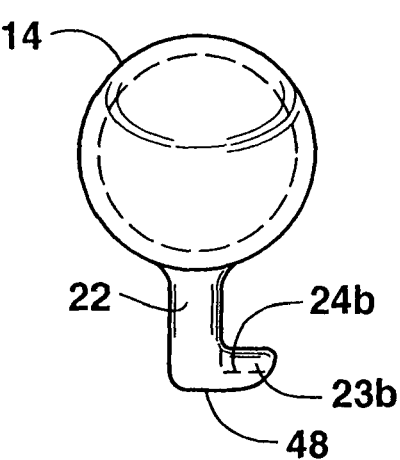
FIG. 6A  FIG. 6B
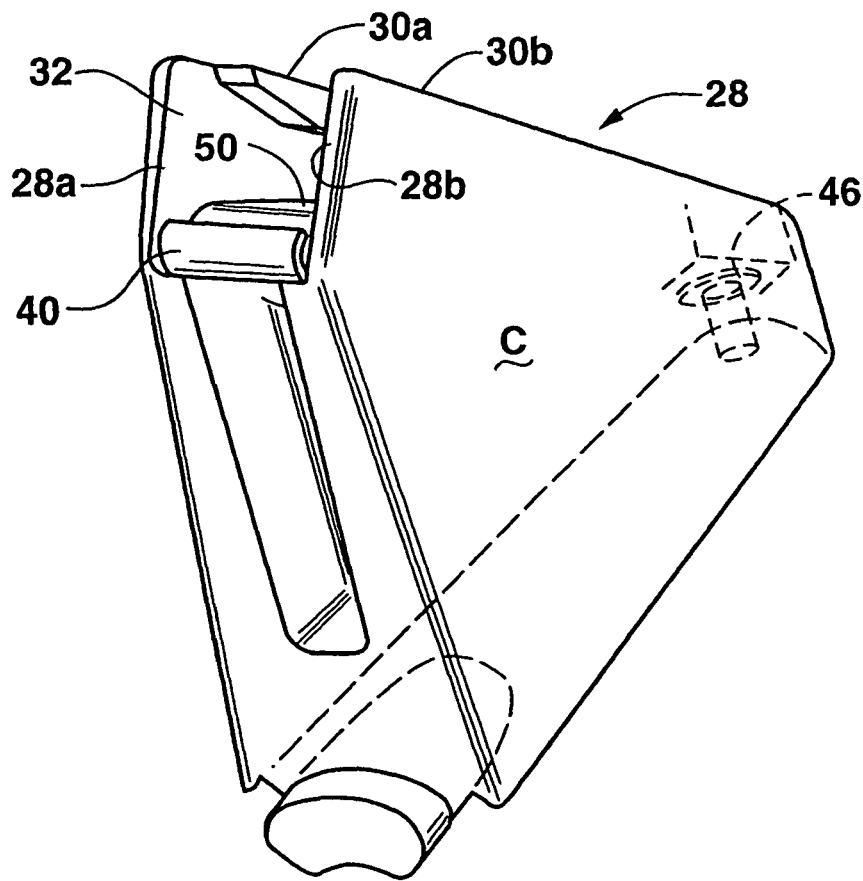
FIG. 7

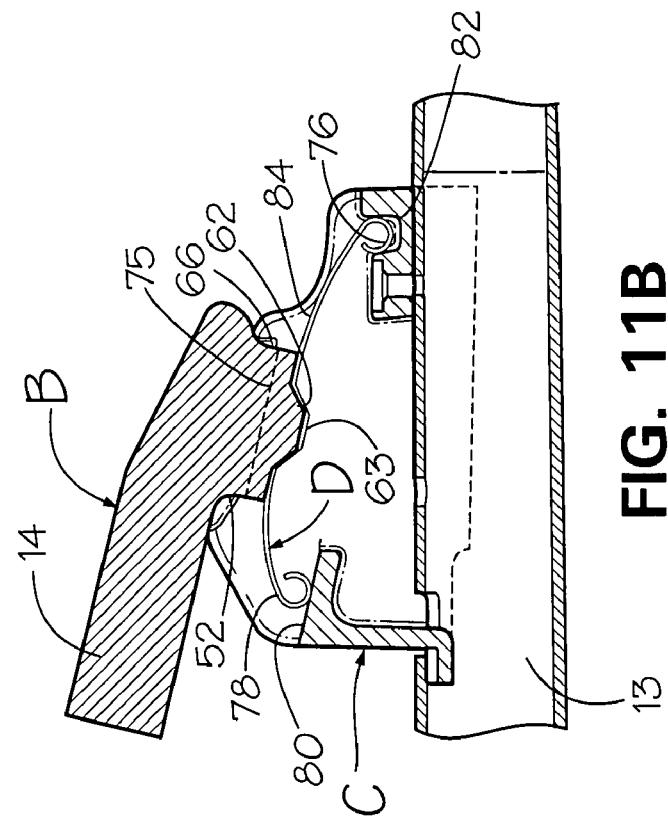
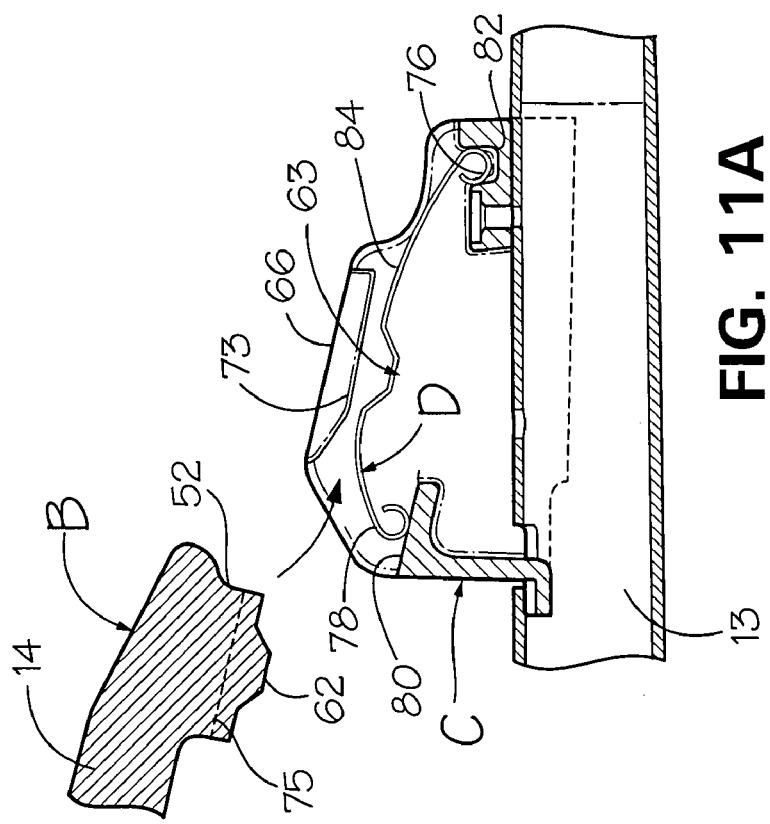

MIRROR STABILIZER ARM CONNECTOR ASSEMBLY

CROSS REFERENCE TO RELATED APPLICATION

This application is a continuation-in-part of U.S. application Ser. No. 11/122,462, filed May 4, 2005 now U.S. Pat. No. 7,303,293.

BACKGROUND OF THE INVENTION

1) Field of the Invention

The invention relates to exterior rearview vehicle mirrors, and more particularly, to a connector assembly that increase surface area contact between components to provide a reliable interlocking connection between a stabilizer arm to a mirror head support arm.

2) Description of Related Art

Typically, mirror support assemblies include a C-shaped support arm carrying a mirror head which attaches to the vehicle at its free ends. In addition, a stabilizer arm is often used that extends from the vehicle to the support arm to support the mirror head in a more stable manner. Previous stabilizer arms have provided a releasable connection between the stabilizer arm and the support arm. This allows the mirror to be folded for various purposes, and also helps protect the mirror from breaking if it strikes an object. Previous connectors for stabilizer arms have used a rubber insert to place a friction in the connector joint so the stabilizer arm is held in place. However, the rubber wears and loses its friction fit. Since the rubber is not very compressible, the rubber tip that provides the friction can only be compressed a certain amount. When that rubber insert wears on the friction surface, it loses its fit.

The prior art stabilizer arm connector assembly also has problems in that three parts are utilized that must be fitted together. The rubber insert must be fitted inside the guide block that the rubber insert is fitted into, and then those two parts must be fitted into a corresponding slot or opening in the connector joint. To fit the rubber insert properly into the guide block, and then fit the parts into the connector housing, are sometimes difficult. If the parts are not fitted correctly then the stabilizer arm does not function properly.

Further, the surface area of contact in the connector joint between the stabilizer arm and support arm tends to be inconsistent and fails to take advantage of potential available surface area for a more stable and solid connection. Because it is difficult to obtain a precise alignment of the connector assembly between the stabilizer arm and support arm due to variances in installation, vehicle bodies, and other such variables, increased surface area for engagement is desired. Lack of adequate contact surface area leads to the interconnection of the stabilizer arm and the support arm being overly stressed at isolated engaging points, resulting in uneven wear that loosens the connection and ultimately results in premature failure of the connector assembly. Accordingly, there is a need for a more reliable connector assembly that provides increased surface area of engagement between the stabilizer arm and support arm.

Accordingly, it is an object of the present invention to provide a connector assembly having an increased surface area of engagement between the stabilizer arm and support arm for a more reliable connection.

It is a further object of the present invention to provide a connector assembly having a reduced manufacturing cost as compared to the prior art.

It is a further object of the present invention to provide a connector assembly that applies a fairly consistent load to resist over loading of the biasing elements to prevent premature failure.

It is a further object of the present invention to provide a connector assembly that attempts to maintain a uniform surface area of engagement to prevent uneven wear and premature failure.

SUMMARY OF THE INVENTION

The above objectives are accomplished according to the present invention in a vehicle mirror assembly for mounting an exterior rearview mirror to a vehicle body. The assembly is of the type having a support arm which can be pivotally mounted to the vehicle for supporting the mirror, and a stabilizer bar having a first end pivotally mounted to the vehicle and a second end attached to the support arm. The present invention further comprises: a connector head carried by one of the second end of the stabilizer arm and the support arm; a connector receiver carried by the other of the stabilizer arm and support arm; a retention slot included in the connector receiver for receiving the connector head; a first locking element carried by the connector head; a biasing element carried in the retention slot for biasing against the connector head when received in the retention slot; and, a second locking element carried by the biasing element for cooperating with the first locking element to releasably engage the connector head with the biasing element in the retention slot so that the biasing element urges the first and second locking elements together to provide a reliable interconnection.

In a further embodiment, the first locking element includes a catch tongue projecting from a bottom side of the connector head for engaging the second locking element of the biasing element.

In a further embodiment, the second locking element includes a catch recess formed in the biasing element which is complementary to the catch tongue for interlocking the connector head with the biasing element.

In a further embodiment, the connector head includes a slot tongue having an expanded contact footing disposed generally at a distal end of the slot tongue for being received in the retention slot.

In a further embodiment, the first locking element includes a catch tongue projecting from a bottom side of the expanded contact footing for engaging the biasing element.

In a further embodiment, the expanded contact footing includes a first lateral flange and a second lateral flange extending transversely to the slot tongue.

In a further embodiment, the first locking element includes a catch tongue projecting across a bottom side of the expanded contact footing that extends between the first lateral flange and the second lateral flange for engaging the second locking element of the biasing element.

In a further embodiment, the second locking element includes a catch recess formed in the biasing element which is complementary to the catch tongue for interlocking the connector head with the biasing element.

In a further embodiment, the retention slot includes a first slot flange projecting into a top opening of the retention slot, and a second slot flange projecting into the top opening opposite the first slot flange for receiving the tongue of the connector head, wherein the first and second slot flanges each have a flat bottom side for engaging the expanded contact footing to retain the connector head in the retention slot.

In a further embodiment, the first lateral flange and the second lateral flange of the expanded contact footing each include a flat top side for engaging the flat bottom side of the first and second slot flanges, respectively, for guiding and retaining the connector head in the retention slot.

In a further embodiment, the biasing element generally traverses the retention slot for biasing the first and second locking elements together.

In a further embodiment, a first distal end of the biasing element is fixed in the connector receiver, and a second distal end of the biasing element is free to move longitudinally relative to the retention slot when compressed by the connector head.

In a further embodiment, the second distal end of the biasing element is carried on a biasing slope disposed in the retention slot so that compression of the biasing element by the connector head causes the second distal end to slide along the biasing slope when compressed.

In a further embodiment, the biasing element comprises an elongated leaf spring having a convex section between the first and second ends, the leaf spring being carried longitudinally in the retention slot so that the connector head engages and depresses the convex section when the connector head is engaged in the connector receiver.

DESCRIPTION OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein:

FIG. 6A is an end elevation of the stabilizer arm and connector head according to the invention;

FIG. 6B is an alternate embodiment of the present invention;

FIG. 7 is a perspective view of a connector receiver according to the invention;

FIG. 11A is a side cross-section view of an alternative embodiment of the connector assembly prior to the connector head engaging said connector receiver according to the present invention;

FIG. 11B is a side cross-section view of an alternative embodiment of the connector assembly with the connector head engaging said connector receiver according to the present invention;

DETAILED DESCRIPTION OF A PREFERRED EMBODIMENT

Figure 1A:
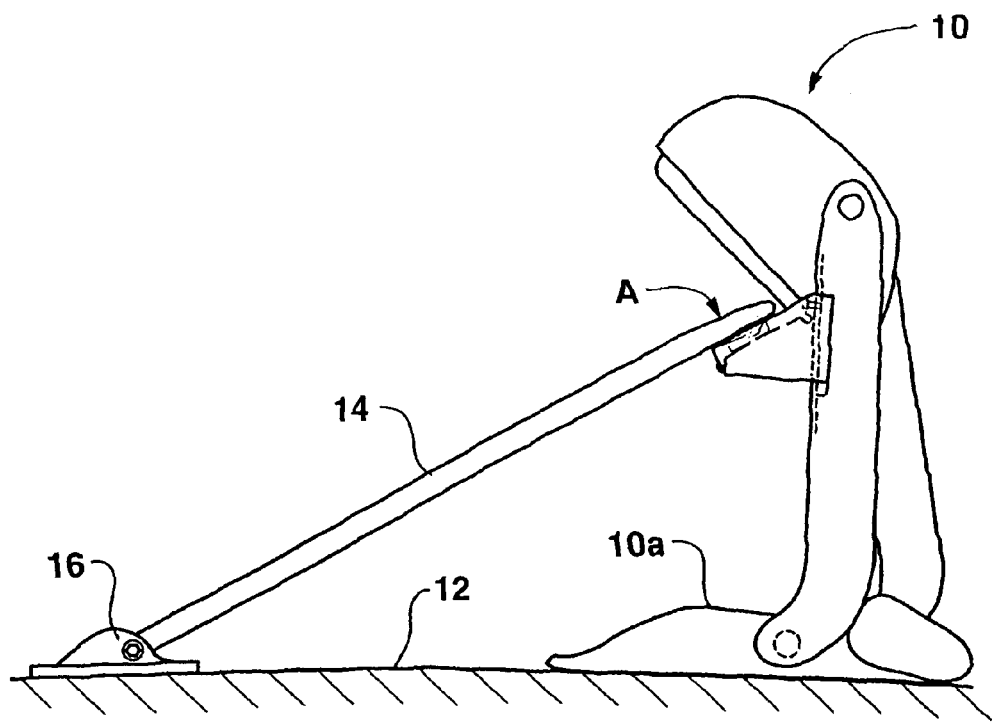
FIG. 1A is a top plan view illustrating a vehicle mirror assembly with a stabilizer arm connector constructed according to the present invention.
Figure 1B:
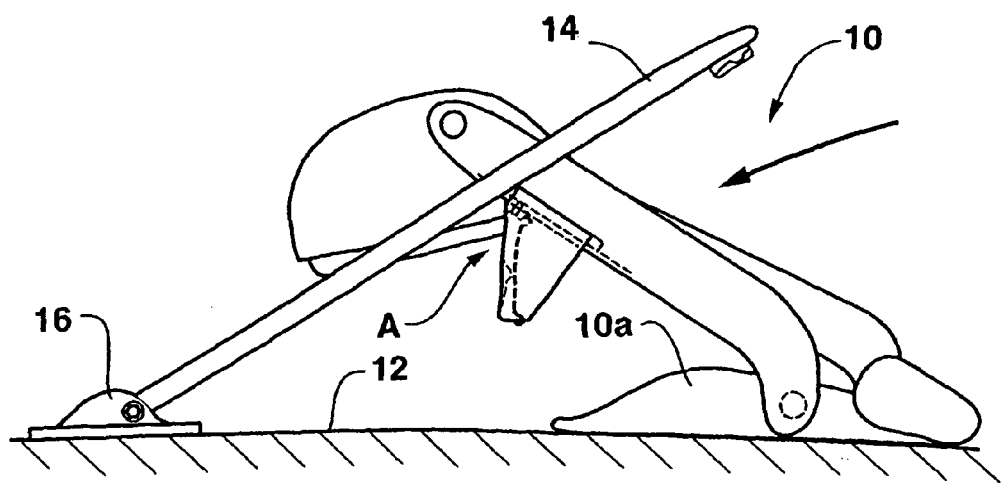
FIG. 1B is a top plan view showing the stabilizer arm disconnected from the mirror assembly.
Figure 2A:
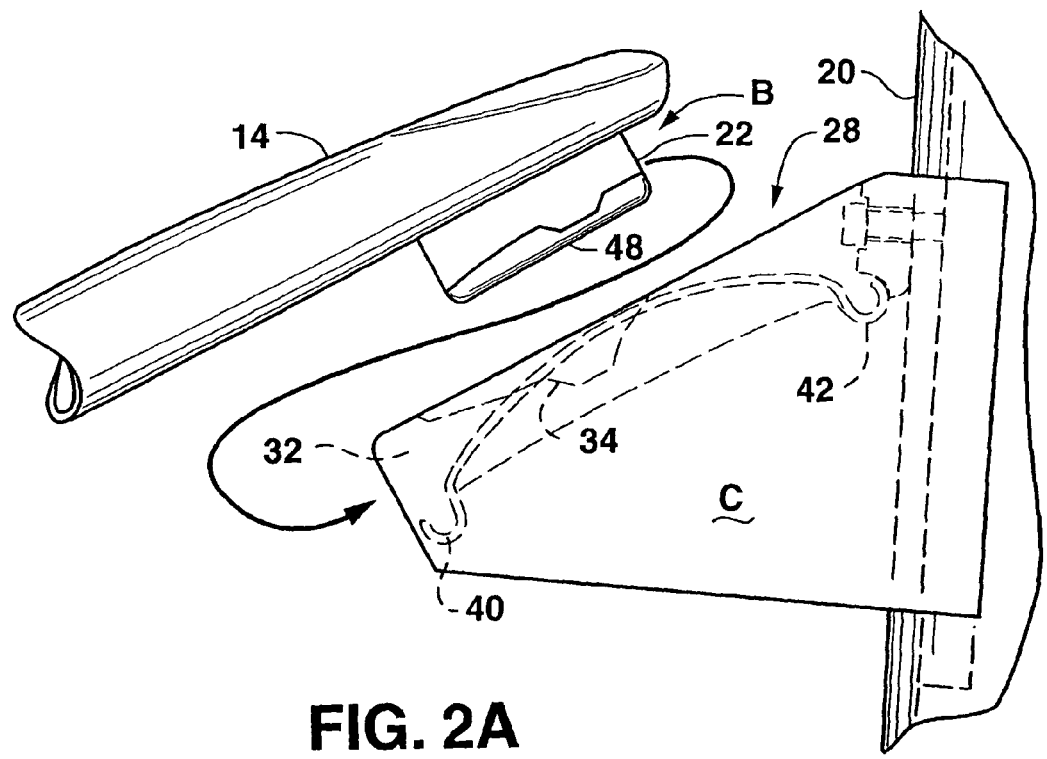
FIG. 2A is a enlarged plan view illustrating a stabilizer arm having a connector head being inserted into a connector receiver having a retention slot according to the invention.
Figure 2B:
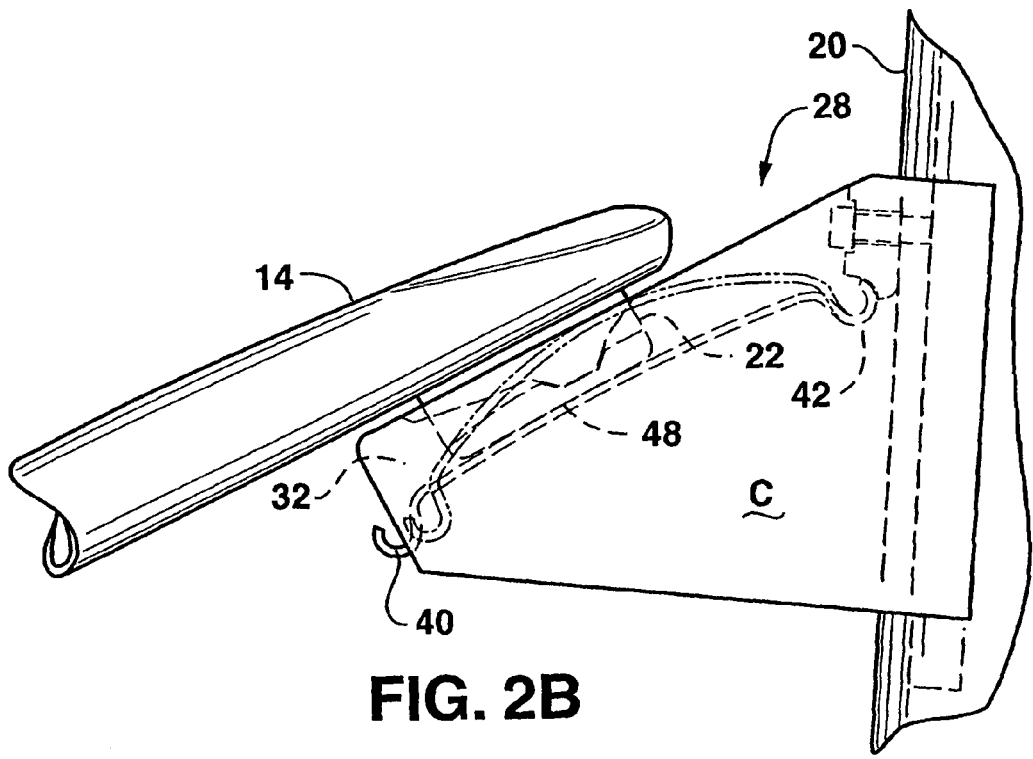
FIG. 2B is a plan view with the connector head engaged in a retention slot.

With reference to the drawings, the invention will now be described in more detail. As can best be seen in FIGS. 1A and 1B, a mirror assembly, designated generally as 10, is illustrated affixed to a body of a vehicle 12. A stabilizer arm 14 is pivotally connected to the vehicle by means of a pivot mount 16. The mirror assembly 10 is connected to the vehicle by suitable fasteners which secure a base 10a to the vehicle 12. Connecting the stabilizer arm to the mirror assembly is a connector assembly, designated generally as A. With the stabilizer arm 14 removed from the connector assembly the mirror assembly may be folded (FIG. 1B). Referring now in more detail to connector assembly A, the connector assembly includes a connector head B and a connector receiver C. While the connector head and receiver may be interchanged on stabilizer arm 14 and a support arm of the mirror assembly, it is preferred that the connector head B be carried by stabilizer arm 14 in that connector receiver C be carried by mirror support arm 20. Connector head B includes a tongue 22 having at least one lateral flange projecting transversely to the tongue (FIG. 6B) Preferably there is a pair of lateral flanges 23a and 23b on either side of tongue 22 (FIG. 6A). Each lateral flange includes a first retention element 24 preferably in the form of a detent. Lateral projection 23a includes a detent or notch 24a and lateral projection 23b includes a notch or detent 24b. Connector receiver C includes a retention slot 28 in which connector head B is received and locked therein. For this purpose, a pair of inwardly extending slot flange 30 projects into an open top 28a of the slot. Preferably there are a pair of slot flanges 30a and 30b projecting inwardly into open top 28a to define a narrow passageway 32 between which tongue 22 of connector head B slides. A second retention element 34 is carried by slot flanges 30a and 30b for interlocking with detents 24a and 24b of the connector head. For this purpose, the nibs and detents correspond in shape. It is to be understood, of course, that a plurality of notches and a plurality of nibs may be utilized to interlock the connector head and connector receiver together instead of a single detent and nib on each flange.

Figure 3:
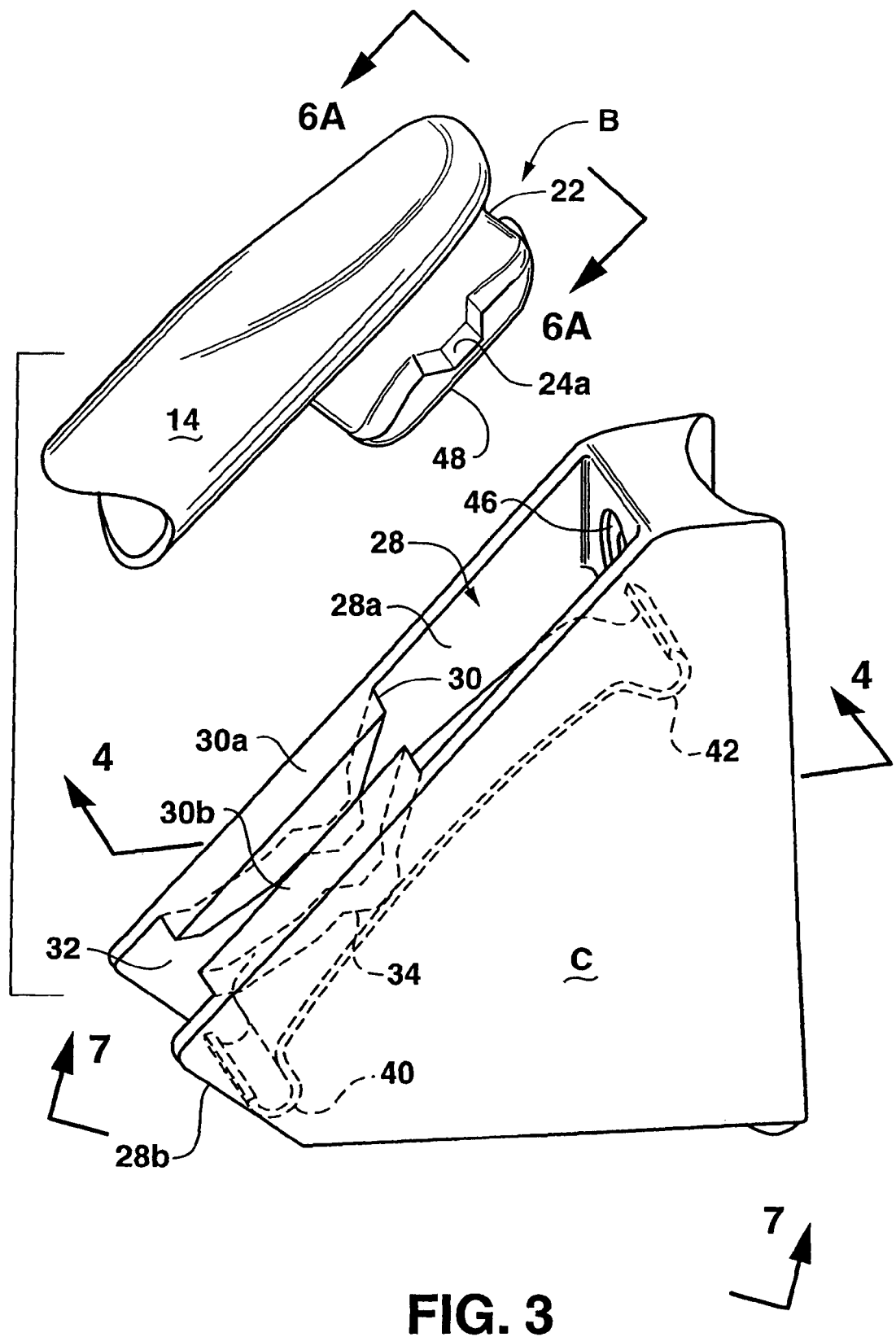
FIG. 3 is a perspective view illustrating a connector assembly for a stabilizer arm and mirror assembly according to the invention.
Figure 4:
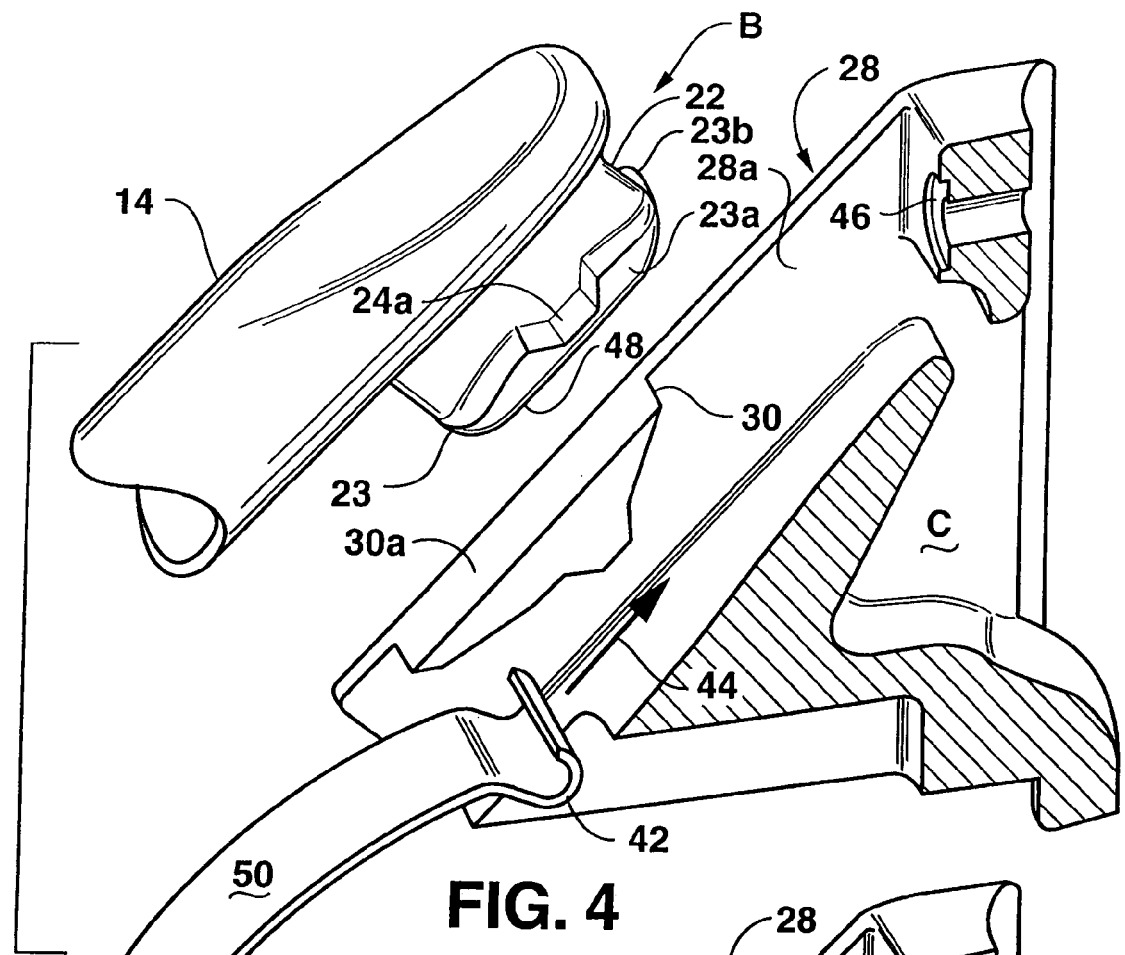
FIG. 4 is a sectional view taken along line 4-4 of FIG. 3.
Figure 5:
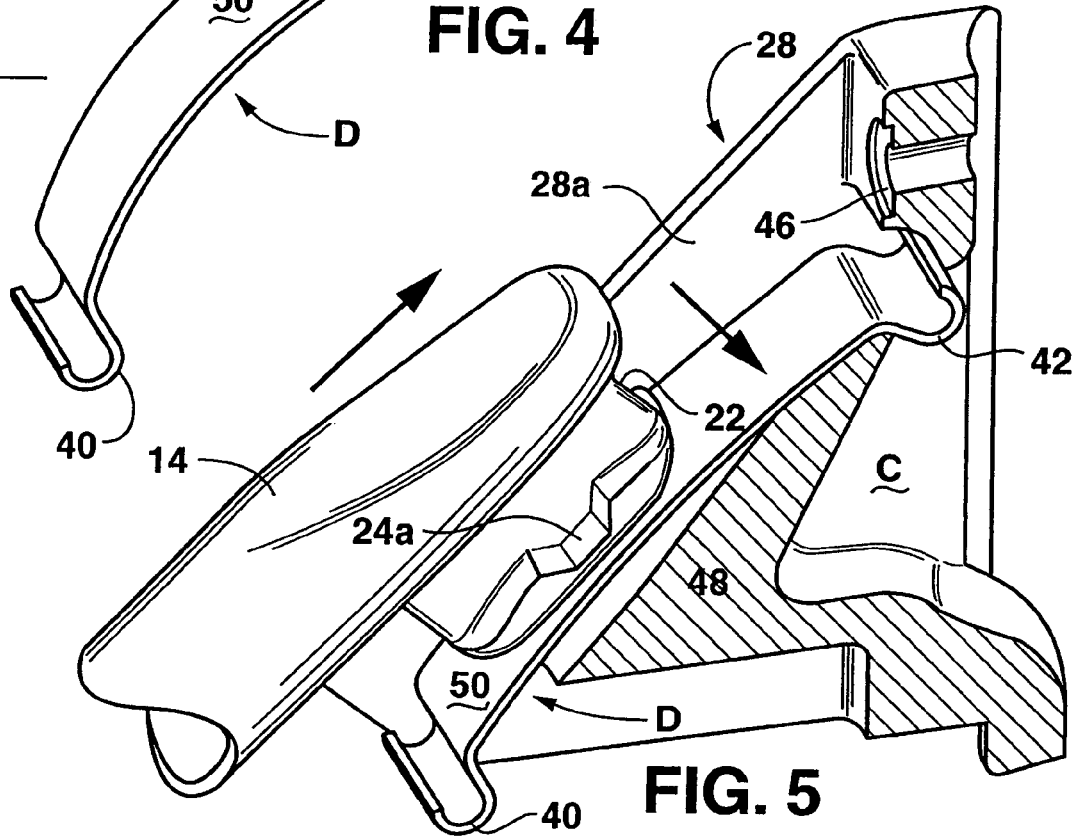
FIG. 5 is a sectional view of FIG. 4 showing the connector head received in a retention slot.

As can best be seen in FIGS. 3 through 5, an elongated biasing element D is carried within retention slot 20a of connector receiver C. Biasing element D is advantageously in the form of a leaf spring having a first end 40 and a second end 42. Preferably end 42 is fixed with respect to the retention slot by affixation in a channel lock 42a (FIG. 8), and end 40 is free to move longitudinally in the retention slot in the direction opposite to the direction that connector head B is inserted into the slot. This allows the leaf spring to be compressed as end 40 moves slightly to allow the compression. Suitable means such as hole/fastener 46, 46a on end and a hook 47 on the other end, may be provided for fastening connector receiver 28 to support arm 20 of the mirror assembly.

Figure 8:
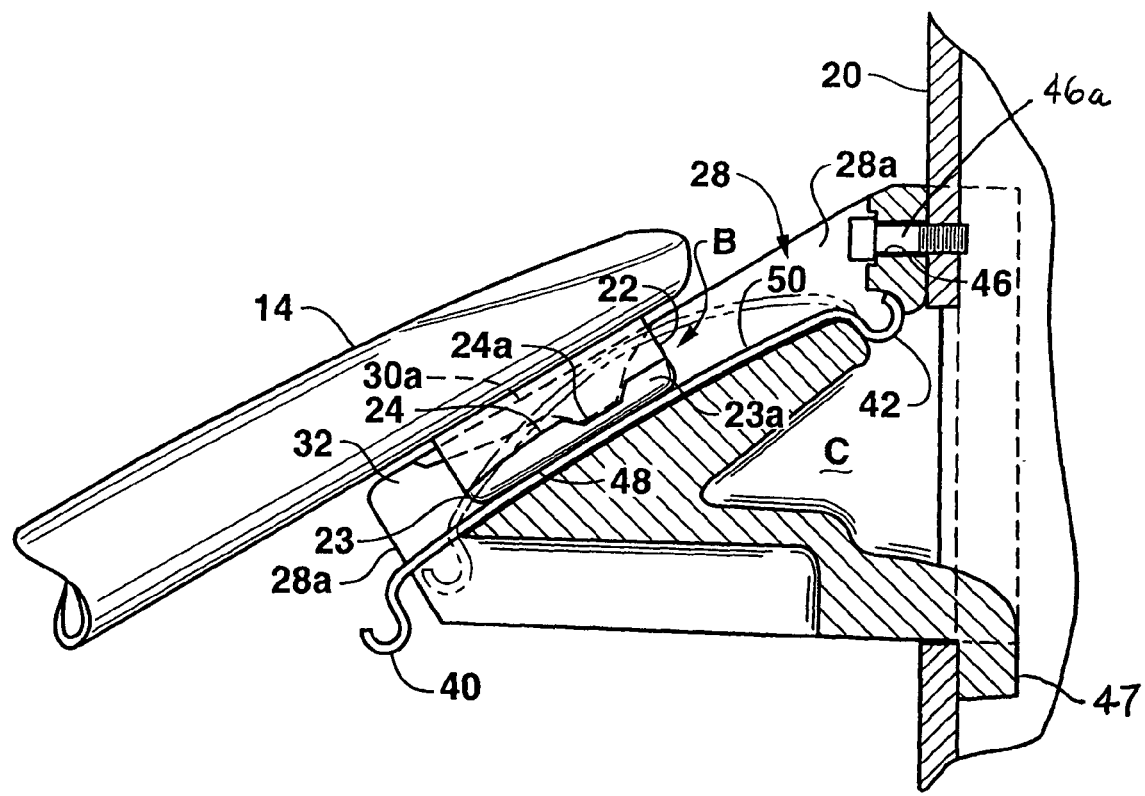
FIG. 8 is a sectional view illustrating the biasing element in natural and compressed positions.
Figure 9:
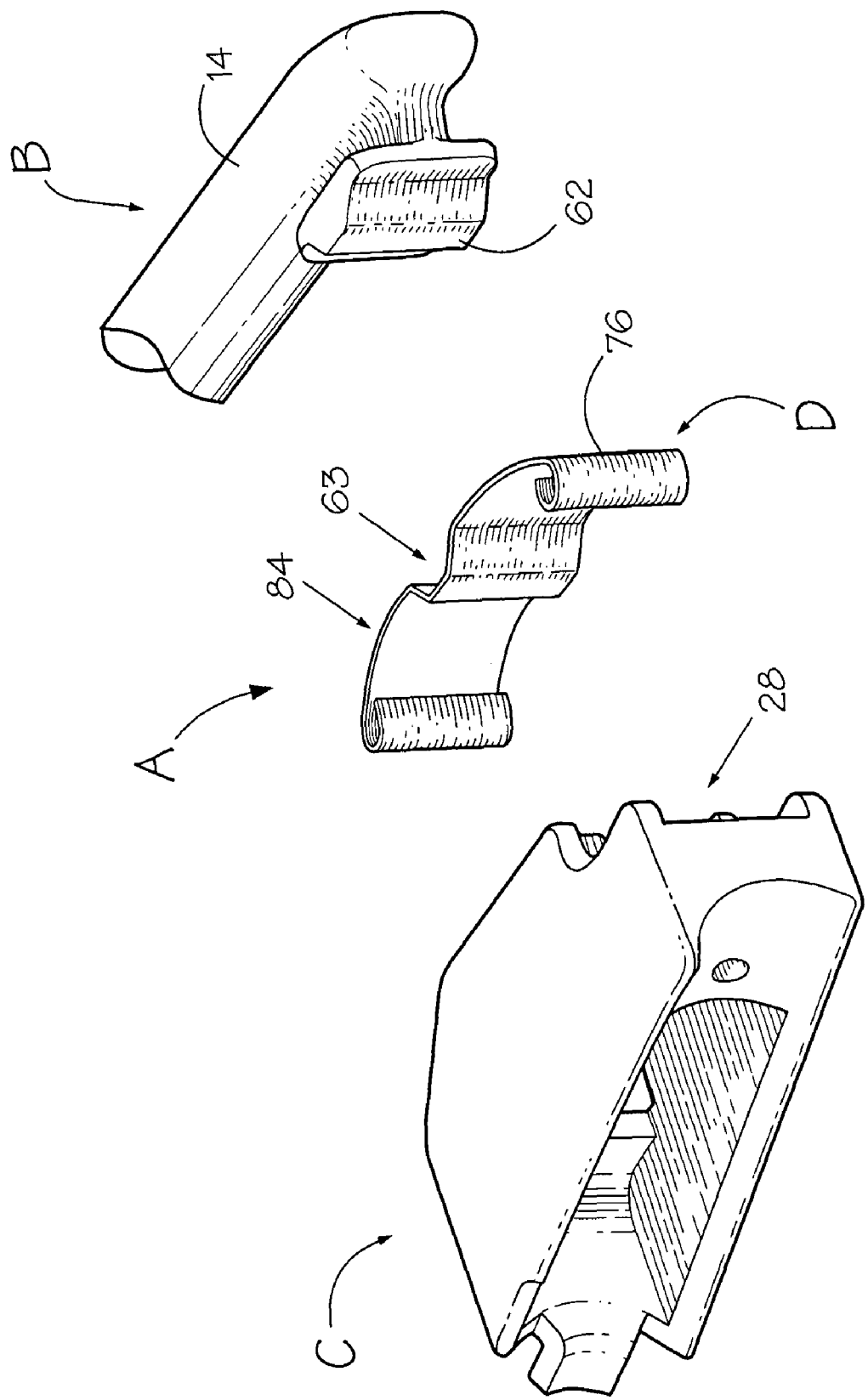
FIG. 9 is an exploded view of an alternative embodiment of the connector assembly according to the present invention.
Figure 10B:
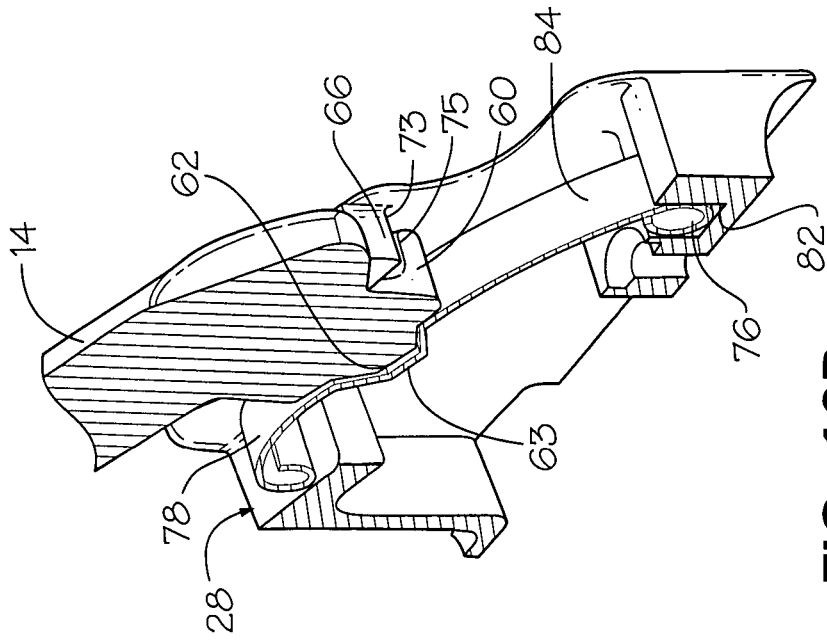
FIG. 10B is a perspective view of an alternative embodiment with the connector head engaging said connector receiver according to the present invention.
Figure 10A:
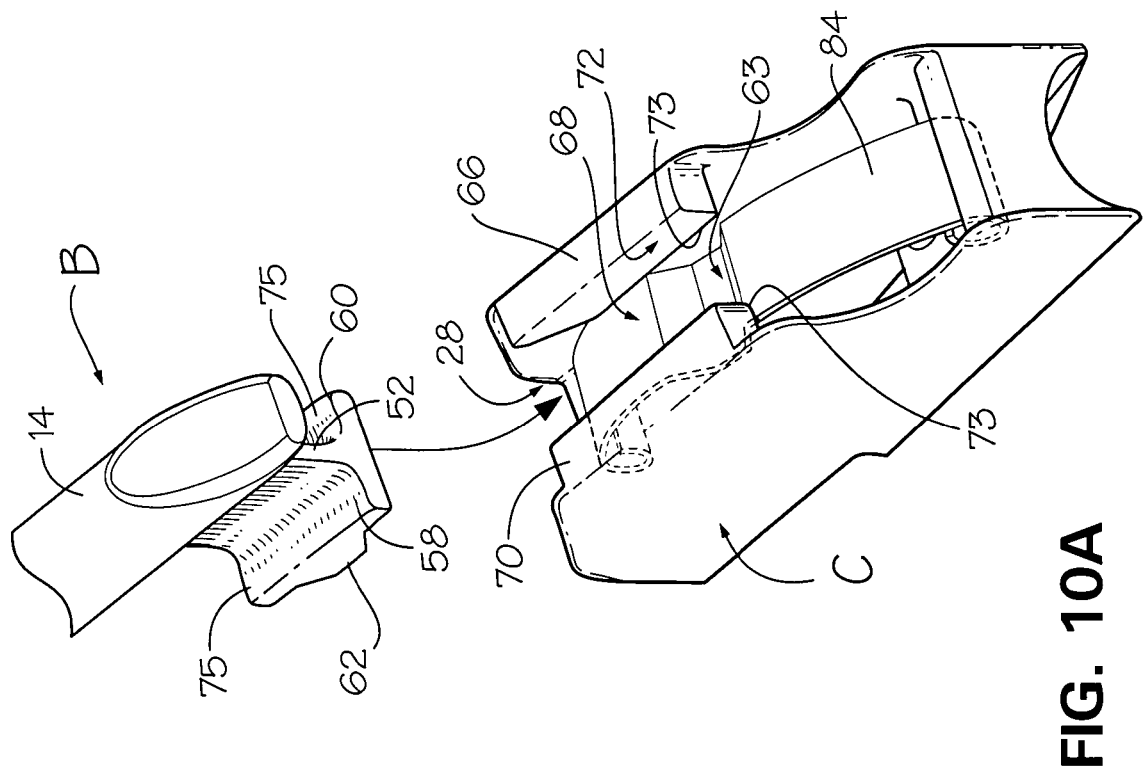
FIG. 10A is a perspective view of an alternative embodiment prior to the connector head engaging said connector receiver according to the present invention.

In operation, to secure stabilizer arm 14 to the mirror assembly, connector head B enters an insertion end 28b of retention slot 28. A smooth bottom surface 48 of connector head B engages a convex surface 50 of biasing element D to press the convex portion downwardly as lateral head flanges 23a and 23b slide underneath slot flanges 30a and 30b until nibs 34a and 34b interlock in detents 24a and 24b. With the interlocking of the nibs and detents, leaf spring D is substantially compressed due to the longitudinal movement of spring end 40 (FIG. 8). A substantial upward force is applied against connector head tightly pressing the nibs into the detent notches of the connector head.

Referring generally to FIGS. 9-13, an alternate embodiment of connector assembly A is illustrated. Preferably, in either arrangement connector head B is carried by stabilizer arm 14 and connector receiver C is carried by support arm 13. Retention slot 28 is included in connector receiver C for receiving connector head B. A first locking element is carried by the connector head and a second locking element is carried within retention slot 28 for cooperating with the first locking element to releasably engage connector head B with connector receiver C. Biasing element D is carried in the retention slot for biasing against connector head B when received in retention slot 28. In this embodiment, the second locking element is carried by biasing element D for cooperating with the first locking element so that the biasing element urges the first and second locking elements together to provide a reliable interconnection.

Figure 12:
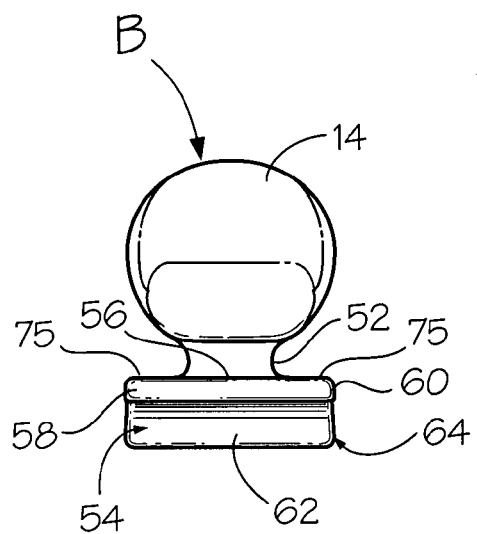
FIG. 12 is a front elevation view of an alternative embodiment of the connector head according to the present invention; and, FIG. 13 is a side elevation view of an alternative embodiment of the connector head according to the present invention.
Figure 13:
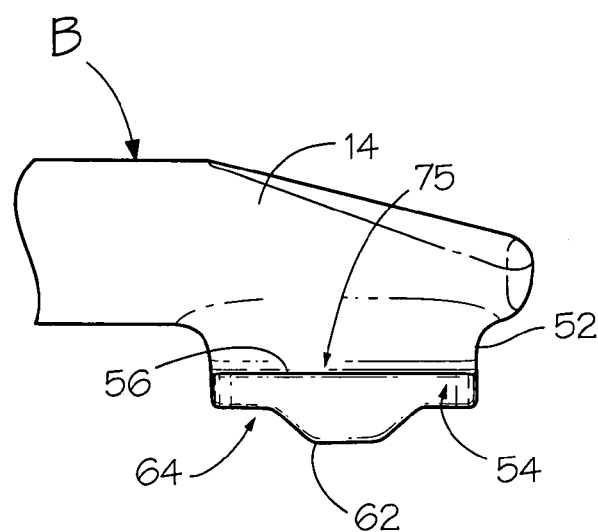

Referring to FIGS. 12 and 13, in this embodiment, connector head B includes a narrow slot tongue 52 having an expanded contact footing, designated generally as 54, disposed generally at a distal end 56 of tongue 52 for engaging retention slot 28 of connector receiver C. In this embodiment, contact footing 54 includes a first lateral flange 58 and a second lateral flange 60 extending transversely to the slot tongue 52. Particular to this embodiment, a catch tongue 62 extends between first lateral flange 58 and second lateral flange 60 across a bottom side, designated generally as 64, of contact footing 54 for engaging biasing element D carried in retention slot 28 of connector receiver C.

Further referring to FIGS. 10A-11B, biasing element D is shown carried in retention slot 28 biasing against bottom side 64 and catch tongue 62 of connector head B for urging the first and second locking elements together. Preferably, the second locking element includes a catch recess 63 formed in biasing element D which is complementary to catch tongue 62 for interlocking connector head B with biasing element D. Accordingly, the detent arrangement between catch tongue 62 of connector head B and catch recess 63 of connector receiver C, provides an increased surface area of engagement between biasing element D and connector head B to prevent uneven wear that may lead to premature failure of the entire connector assembly A.

In this alternative embodiment, retention slot 28 preferably includes a first slot flange 66 projecting into a top opening, designated generally as 68 of retention slot 28. Further, a second slot flange 70 is provided projecting into top opening 68 opposite first slot flange 66. Together, first slot flange 66 and second slot flange 70 define a guide channel, designated generally as 72, between the first and second slot flanges for receiving slot tongue 52 of connector head B.

In the illustrated embodiment, first slot flange 66 and second slot flanges 70 each have a flat bottom side 73 for engaging expanded contact footing 54 to retain connector head B in retention slot 28. Further, first lateral flange 58 and second lateral flange 60 of expanded contact footing 54 each include a flat top side 75 for engaging flat bottom side 73 of first and second slot flanges 66 and 70, respectively, for guiding and retaining connector head B in retention slot 28.

Preferably, biasing element D generally traverses retention slot 28 for biasing against bottom side 64 and catch tongue 62 of contact footing 54 to urge the first locking element of connector head B together with the second locking element of connector receiver C, as detailed above. Preferably, a first distal end 76 of biasing element D is fixed in connector receiver C, and a second distal end 78 is free to move longitudinally relative to retention slot 28 when compressed by connector head B. Affixing first distal end 76 provides a hinge point for biasing element D when compressed.

In the illustrated embodiment, second distal end 78 is carried on a biasing slope 80 disposed in retention slot 28. In this embodiment, compression of biasing element D by connector head B causes second distal end 78 to slide along biasing slope 80 to reduce loading forces on the biasing element and allowing for compression to receive the connector head in the retention slot. Preferably, a channel lock 82 is provided at a distal end of retention slot 28 for affixing first end 76 of biasing element D in connector receiver C.

In a further embodiment, biasing element D comprises an elongated leaf spring. The leaf spring includes a convex section, designated generally as 84, between the first and second ends 76 and 78. The leaf spring is carried longitudinally in retention slot 28 so that bottom side 64 and catch tongue 62 of connector head B engage and depress convex section 84 of biasing element D to be received in catch recess 63 when connector head B is inserted in connector receiver C.

While a preferred embodiment of the invention has been described using specific terms, such description is for illustrative purposes only, and it is to be understood that changes and variations may be made without departing from the spirit or scope of the following claims.

What is claimed is:

1. A vehicle mirror assembly for mounting an exterior rearview mirror to a vehicle body, the assembly having a support arm which is pivotally mounted to the vehicle for supporting the mirror, and a stabilizer arm having a first end pivotally mounted to the vehicle and a second end attached to the support arm, said assembly comprising:
   a connector head carried by one of said second end of said stabilizer arm and said support arm;
   a connector receiver carried by the other of said stabilizer arm and support arm;
   a retention slot included in said connector receiver for receiving said connector head;
   a first locking element carried by said connector head;
   a biasing element carried in said retention slot for biasing against said connector head when received in said retention slot; and,
   a second locking element carried by said biasing element for cooperating with said first locking element to releasably engage said connector head with said biasing element in said retention slot so that said biasing element urges said first and second locking elements together to provide a reliable interconnection.

2. The assembly of claim 1 wherein said first locking element includes a catch tongue projecting from a bottom side of said connector head for engaging said second locking element of said biasing element.

3. The assembly of claim 2 wherein said second locking element includes a catch recess formed in said biasing element which is complementary to said catch tongue for interlocking said connector head with said biasing element.

4. The assembly of claim 1 wherein said connector head includes a slot tongue having an expanded contact footing disposed generally at a distal end of said slot tongue for being received in said retention slot.

5. The assembly of claim 4 wherein said first locking element includes a catch tongue projecting from a bottom side of said expanded contact footing for engaging said biasing element.

6. The assembly of claim 4 wherein said expanded contact footing includes a first lateral flange and a second lateral flange extending transversely to said slot tongue.

7. The assembly of claim 6 wherein said first locking element includes a catch tongue projecting across a bottom side of said expanded contact footing that extends between said first lateral flange and said second lateral flange for engaging said second locking element of said biasing element.

8. The assembly of claim 7 wherein said second locking element includes a catch recess formed in said biasing element which is complementary to said catch tongue for interlocking said connector head with said biasing element.

9. The assembly of claim 6 wherein said retention slot includes a first slot flange projecting into a top opening of said retention slot, and a second slot flange projecting into said top opening opposite said first slot flange for receiving said tongue of said connector head, wherein said first and second slot flanges each have a flat bottom side for engaging said expanded contact footing to retain said connector head in said retention slot.

10. The assembly of claim 9 wherein said first lateral flange and said second lateral flange of said expanded contact footing each include a flat top side for engaging said flat bottom side of said first and second slot flanges, respectively, for guiding and retaining said connector head in said retention slot.

11. The assembly of claim 1 wherein said biasing element generally traverses said retention slot for biasing said first and second locking elements together.

12. The assembly of claim 1 where a first distal end of said biasing element is fixed in said connector receiver, and a second distal end of said biasing element is free to move longitudinally relative to said retention slot when compressed by said connector head.

13. The assembly of claim 12 wherein said second distal end of said biasing element is carried on a biasing slope disposed in said retention slot so that compression of said biasing element by said connector head causes said second distal end to slide along said biasing slope when compressed.

14. The assembly of claim 12 wherein said biasing element comprises an elongated leaf spring having a convex section between said first and second ends, said leaf spring being carried longitudinally in said retention slot so that said connector head engages and depresses said convex section when said connector head is engaged in said connector receiver.

15. A connector assembly for releasably attaching a stabilizer arm to a support arm of a vehicle exterior rearview mirror, said connector assembly comprising:
a connector head carried by one of said stabilizer arm and said support arm;
a connector receiver carried by the other of said stabilizer arm and support arm;
a retention slot included in said connector receiver for receiving said connector head;
a biasing element carried in said retention slot for biasing against said connector head when received in said retention slot;
a catch tongue projecting from said connector head;
a catch recess carried said biasing element which is complementary to said catch tongue for interlocking said connector head with said biasing element in said retention slot to provide an increased surface area of engagement; and,
wherein said connector head includes a slot tongue having an expanded contact footing disposed generally at a distal end of said slot tongue for being received in said retention slot, and said catch tongue projects from a bottom side of said expanded contact footing for engaging said catch recess of said biasing element.

16. The assembly of claim 15 wherein said expanded contact footing includes a first lateral flange and a second lateral flange extending transversely to said slot tongue.

17. The assembly of claim 16 wherein said catch tongue projects across said bottom side of said expanded contact footing between said first lateral flange and said second lateral flange.

18. The assembly of claim 17 wherein said catch recess is formed in said biasing element for interlocking said connector head with said biasing element.

19. The assembly of claim 15 wherein said biasing element comprises an elongated leaf spring having a convex section between a first distal end and a second distal end, wherein said leaf spring is carried longitudinally in said retention slot and said catch recess is formed in said leaf spring so that said catch tongue is received in said catch recess when said connector head engages and depresses said leaf spring during insertion in said retention slot.

20. A connector assembly for releasably attaching a stabilizer arm to a support arm of a vehicle exterior rearview mirror, said connector assembly comprising:
a connector head carried by one of said stabilizer arm and said support arm;
a connector receiver carried by the other of said stabilizer arm and support arm;
a retention slot included in said connector receiver receiving said connector head;
a leaf spring generally traversing said retention slot for engaging said connector head;
a first locking element carried by said connector head; and,
a second locking element carried by said leaf spring for cooperating with said first locking element to releasably engage said connector head with said connector receiver.

21. The assembly of claim 20 wherein said first locking element includes a catch tongue projecting from a bottom side of said connector head for engaging said second locking element, and said second locking element includes a catch recess formed in said leaf spring which is complementary to said catch tongue for interlocking said connector head with said leaf spring.

22. The assembly of claim 20 wherein said connector head includes a slot tongue having an expanded contact footing disposed generally at a distal end of said slot tongue for being received in said retention slot.

23. The assembly of claim 22 wherein said expanded contact footing includes a first lateral flange and a second lateral flange extending transversely to said slot tongue, wherein said first locking element includes a catch tongue projecting across a bottom side of said expanded contact footing that extends between said first lateral flange and said second lateral flange for engaging said second locking element of said leaf spring.

24. The assembly of claim 23 wherein said second locking element includes a catch recess formed in said leaf spring which is complementary to said catch tongue for interlocking said connector head with said leaf spring.

* * * * *